(12) United States Patent
Yang et al.

(10) Patent No.: US 11,082,992 B2
(45) Date of Patent: Aug. 3, 2021

(54) RESOURCE SCHEDULING METHOD AND DEVICE

(71) Applicant: GUANGDONG OPPO MOBILE TELECOMMUNICATIONS CORP., LTD., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 81 days.

(21) Appl. No.: 16/607,905

(22) PCT Filed: Apr. 26, 2017

(86) PCT No.: PCT/CN2017/082029
§ 371 (c)(1),
(2) Date: Oct. 24, 2019

(87) PCT Pub. No.: WO2018/195820
PCT Pub. Date: Nov. 1, 2018

(65) Prior Publication Data
US 2020/0187221 A1    Jun. 11, 2020

(51) Int. Cl.
*H04W 72/12* (2009.01)
*H04W 28/02* (2009.01)
*H04W 80/02* (2009.01)

(52) U.S. Cl.
CPC ... *H04W 72/1226* (2013.01); *H04W 28/0278* (2013.01); *H04W 72/1242* (2013.01); *H04W 72/1284* (2013.01); *H04W 80/02* (2013.01)

(58) Field of Classification Search
CPC ......... H04W 72/1226; H04W 72/1242; H04W 72/1284; H04W 28/0278
See application file for complete search history.

(56) References Cited

U.S. PATENT DOCUMENTS

2012/0224552 A1* 9/2012 Feuersanger ....... H04W 52/146
370/329
2015/0003336 A1* 1/2015 Singh .................... H04W 72/02
370/329
(Continued)

FOREIGN PATENT DOCUMENTS

CN    104363598    2/2015
CN    105519222    4/2016
(Continued)

OTHER PUBLICATIONS

European Patent Office, Search Report for EP Appl. No. 17906962.0, dated Mar. 3, 2020.
(Continued)

*Primary Examiner* — Jamal Javaid
*Assistant Examiner* — Ryan C Kavleski
(74) *Attorney, Agent, or Firm* — Hodgson Russ LLP

(57) ABSTRACT

The present disclosure provides a resource scheduling method and device. The method includes: determining, by a terminal device, a buffer status report BSR, wherein the BSR indicates that data to be transmitted of the terminal device comprises target-type data; transmitting, by the terminal device, the BSR to a network device, wherein the network device configures a transmitting resource preferentially for the terminal device based on the BSR.

14 Claims, 2 Drawing Sheets

100

Determining, by a Terminal Device, Buffer Status Report BSR, Wherein BSR Indicates That Data to Be Transmitted of Terminal Device Comprises Target-Type Data — S110

TransmitTing, by the Terminal Device, BSR to Network Device, Wherein Network Device Configures Transmitting Resource Preferentially for Terminal Device Based on BSR — S120

(56) References Cited

U.S. PATENT DOCUMENTS

| | | | | |
|---|---|---|---|---|
| 2015/0110040 | A1* | 4/2015 | Zhao | H04W 24/10 370/329 |
| 2016/0007229 | A1* | 1/2016 | Gao | H04W 76/11 370/329 |
| 2016/0150564 | A1 | 5/2016 | Quan et al. | |
| 2017/0071010 | A1 | 3/2017 | Lim et al. | |

FOREIGN PATENT DOCUMENTS

| | | |
|---|---|---|
| EP | 2958387 | 12/2015 |
| EP | 3097733 | 11/2016 |
| EP | 3226599 | 4/2017 |
| EP | 3188559 | 5/2017 |
| JP | 5570586 | 8/2014 |
| JP | 2016527838 | 9/2016 |
| KR | 101405041 | 6/2014 |
| WO | 2015019043 | 2/2015 |
| WO | 2015070444 | 5/2015 |
| WO | 2015179059 | 11/2015 |
| WO | 2016082652 | 6/2016 |

OTHER PUBLICATIONS

WIPO, ISR for PCT/CN2017/082029, dated Jan. 16, 2018.
KIPO, Office Action for KR Application No. 10-2019-7032698, dated Jan. 25, 2021.
JPO, Office Action for JP Application No. 2019-557773, dated Feb. 12, 2021.
RAN2, "LS to SA4 on the progress of study on enhancement of VoLTE", 3GPP TSG-RAN WG2 Meeting #95, Aug. 26, 2016.
Huawei, Hisilicon, "Enhancements for SR and BSR", 3GPP TSG-RAN WG2 #97bis, Apr. 7, 2017.
IPI, Office Action for IN Application No. 201917044481, dated Feb. 9, 2021.

* cited by examiner

RESOURCE SCHEDULING METHOD AND DEVICE

CROSS-REFERENCE TO RELATED APPLICATIONS

This application is a U.S. national phase application of International Application No. PCT/CN2017/082029, filed Apr. 26, 2017, the entire disclosure of which is incorporated herein by reference.

TECHNICAL FIELD

Embodiments of the present disclosure relate to the field of communication, and more particularly, to a method and a device for resource scheduling.

BACKGROUND

In a wireless communication system, a network device needs to determine an uplink resource allocated to a terminal device based on a volume of data to be transmitted in an uplink buffer of a terminal device. Generally, the terminal device informs the network device the volume of data to be transmitted through the Buffer Status Report (BSR), and after the network device has allocated a resource to it, it uses the resource allocated by the network device based on the priority of a logical channel.

SUMMARY

In a first aspect, a method for resource scheduling is provided, comprising: determining, by a terminal device, a Buffer Status Report BSR, wherein the BSR indicates that data to be transmitted of the terminal device comprise target-type data; transmitting, by the terminal device, the BSR to a network device, wherein the network device configures a transmitting resource preferentially for the terminal device based on the BSR.

In a second aspect, a method for resource scheduling is provided, comprising: receiving, by a network device, a buffer status report BSR sent by a terminal device, wherein the BSR indicates that data to be transmitted of the terminal device comprise target-type data; configuring, by the network device, a transmitting resource preferentially for the terminal device based on the BSR.

In a third aspect, a terminal device is provided, which is used for performing the above methods in the first aspect or any possible implementations thereof. According to exemplary embodiments, the terminal device includes functional modules for performing the above method in the first aspect or any possible implementations thereof.

In a fourth aspect, a network device is provided, which is used for performing the above method in the second aspect or any possible implementations thereof. According to exemplary embodiments, the network device includes functional modules for performing the above method in the second aspect or any possible implementations thereof.

In a fifth aspect, a terminal device is provided, comprising: a processor, a memory and a transceiver. The processor, the memory, and the transceiver communicate with each other through an internal connection path, transmitting signals of control and/or data, such that the terminal device performs the above method in the first aspect or any possible implementations thereof.

In a sixth aspect, a network device is provided, comprising: a processor, a memory and a transceiver. The processor, the memory, and the transceiver communicate with each other through an internal connection path, transmitting signals of control and/or data, such that the network device performs the above method in the second aspect or any possible implementations thereof.

In a seventh aspect, a computer readable medium is provided, which is configured to store a computer program, wherein the computer program comprises instructions for performing the above method in the first aspect or any possible implementations thereof.

In an eighth aspect, a computer readable medium is provided, which is configured to store a computer program, wherein the computer program comprises instructions for performing the above method in the second aspect or any possible implementations thereof.

DETAILED DESCRIPTION

Figure 1:
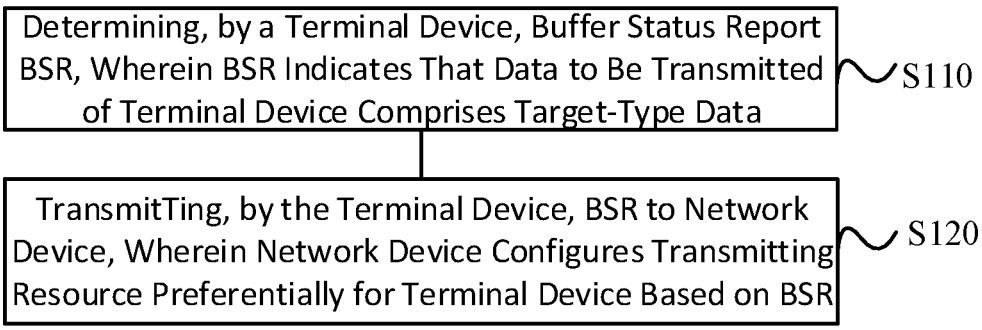
FIG. 1 is a schematic flow chart of a method for resource scheduling according to an embodiment of the present disclosure.

The technical solutions in the embodiments of the present disclosure will be clearly and completely described in the following with reference to drawings of the embodiments of the present disclosure.

It should be understood that technical solutions of embodiments of the present disclosure may be applied in various kinds of communication systems, such as the Global System of Mobile (GSM) communication system, the Code Division Multiple Access (CDMA) system, the Wideband Code Division Multiple Access (WCDMA) system, the General Packet Radio Service (GPRS), the Long Term Evolution (LTE) system, the LTE Frequency Division Duplex (FDD) system, the LTE Time Division Duplex (TDD), the Universal Mobile Telecommunication System (UMTS), the Worldwide Interoperability for Microwave Access (WiMAX) communication system, a 5G system or a New Radio (NR) system.

In the embodiments of the present disclosure, the terminal device may include but is not limited to a Mobile Station (MS), a Mobile Terminal, a Mobile Telephone, a User Equipment (UE), a handset, a portable equipment, a vehicle and so on. The terminal device may communicate with one or more core networks via Radio Access Network (RAN). For example, the terminal device may be a mobile phone (or also called as a "cellular" phone), a computer with radio communication function and so on. The terminal device may also be a mobile device which is portable, pocket-sized, handheld, computer-integrated or in-vehicle.

The network device involved in the embodiments of the present disclosure is an apparatus deployed in a radio access network to provide a function of wireless communication for a terminal device. The network device may be a base station, wherein the base station may comprise various forms of macro base station, micro base station, relay station, access point, and the like. In systems with various radio access technologies, the names of devices with the function of base station may vary. For example, in an LTE network, an Evolved NodeB (eNB or eNodeB) is called as a Node B or the like in a 3rd Generation (3G) network. The network device may also be a core network device.

In the existing LTE systems, when a UE needs to transmit uplink data, the UE informs an eNodeB that how many data need to be transmitted in its buffer through a Buffer Status Report (BSR), so that the eNodeB determines how many uplink resources are allocated to the UE.

According to exemplary embodiments, a UE may establish a plurality of Radio Bearers according to different services, and each Bearer corresponds to one logical channel. The UE may report the BSR based on a Logical Channel Group (LCG) to notify the eNodeB how many data need to be transmitted in this LCG group. The eNodeB only knows that the UE has data to transmit, but does not know which kind of data the UE needs to transmit, so that in the case of congestion on the communication link, the eNodeB may not allocate an uplink resource for the UE. It leads to that even if the UE has important data to upload, this part of important data cannot be transmitted in time, which affects the user experience.

Therefore, the present disclosure provides a method for resource scheduling, the terminal device transmits to a network device a BSR which indicates that data to be transmitted of the terminal device comprise the target-type data, so that the network device configures a transmitting resource preferentially for the terminal device when receiving the BSR, which reduces the possibility that a terminal device cannot transmit in time due to the fact that no transmitting resource has been allocated in time and improve the user experience.

Embodiments of the present disclosure provides A method for resource scheduling, including:

determining, by a terminal device, a buffer status report BSR, wherein the BSR indicates that data to be transmitted of the terminal device comprises target-type data;

transmitting, by the terminal device, the BSR to a network device, wherein the network device configures a transmitting resource preferentially for the terminal device based on the BSR.

According to exemplary embodiments, the method further includes:

receiving, by the terminal device, indicating information transmitted by the network device, wherein the indicating information indicates that the terminal device uses a configured transmitting resource to preferentially transmit data in a logical channel which carries the target-type data.

According to exemplary embodiments, the BSR comprises related information of the target-type data, wherein the related information of the target-type data comprises at least one of the following information: first information indicating a logical channel or a logical channel group which carries the target-type data, second information indicating a volume of target data which relates to the target-type data, and third information indicating a location of the target-type data in the logical channel.

According to exemplary embodiments, the volume of target data is a data volume of a data packet which comprises the target-type data; or, the volume of target data is a sum of a data volume of the target-type data and data volumes of data before the target-type data in a logical channel which carries the target-type data.

According to exemplary embodiments, the transmitting, by the terminal device, the BSR to the network device comprises:

transmitting, by the terminal device, a medium access control protocol data unit MAC PDU to the network device, wherein the MAC PDU comprises the BSR.

According to exemplary embodiments, a MAC service data unit SDU in the MAC PDU comprises the related information of the target-type data.

According to exemplary embodiments, the target-type data is data of intra-coded I frame.

Embodiments of the present disclosure provides a method for resource scheduling, including:

receiving, by a network device, a buffer status report BSR transmitted by a terminal device, wherein the BSR indicates that data to be transmitted of the terminal device comprises target-type data;

configuring, by the network device, a transmitting resource preferentially for the terminal device based on the BSR.

According to exemplary embodiments, the method further includes:

transmitting, by the network device, indicating information to the terminal device, wherein the indicating information indicates that the terminal device uses a configured transmitting resource to preferentially transmit data in a logical channel which carries the target-type data.

According to exemplary embodiments, the BSR comprises related information of target-type data, wherein the related information of target-type data comprises at least one of the following information: first information indicating a logical channel or a logical channel group which carries the target-type data, second information indicating a volume of target data which relates to the target-type data, and third information indicating a location of the target-type data in a logical channel.

According to exemplary embodiments, the volume of target data is a data volume of a data packet which comprises the target-type data; or, the volume of target data is a sum of a data volume of the target-type data and data volumes of data before the target-type data in a logical channel which carries the target-type data.

According to exemplary embodiments, the receiving, by the network device, a buffer status report BSR transmitted by a terminal device comprises:

receiving, by the network device, a medium access control protocol data unit MAC PDU transmitted by the terminal device, wherein the MAC PDU comprises the BSR.

According to exemplary embodiments, a MAC service data unit SDU in the MAC PDU comprises the related information of the target-type data.

According to exemplary embodiments, the target-type data is data of intra-coded I frame.

Embodiments of the present disclosure provide a terminal device, including:

a processing module, configured to determine a buffer status report BSR, wherein the BSR indicates that data to be transmitted of the terminal device comprise target-type data;

a transceiver module, configured to transmit the BSR to a network device, wherein the network device configures a transmitting resource preferentially for the terminal device based on the BSR.

According to exemplary embodiments, the transceiver module is further configured to:

receive indicating information transmitted by the network device, wherein the indicating information indicates that the terminal device uses a configured transmitting resource to preferentially transmit data in a logical channel which carries the target-type data.

According to exemplary embodiments, the BSR comprises related information of target-type data, wherein the related information of target-type data comprises at least one of the following information: first information indicating a logical channel or a logical channel group which carries the target-type data, second information indicating a volume of target data which relates to the target-type data, and third information indicating a location of the target-type data in a logical channel.

According to exemplary embodiments, the volume of target data is a data volume of a data packet which comprises the target-type data; or, the volume of target data is a sum of a data volume of the target-type data and data volumes of data before the target-type data in a logical channel which carries the target-type data.

According to exemplary embodiments, the transmitting module is configured to:

transmit a medium access control protocol data unit MAC PDU to the network device, wherein the MAC PDU comprises the BSR.

According to exemplary embodiments, a MAC service data unit SDU in the MAC PDU comprises the related information of the target-type data.

According to exemplary embodiments, the target-type data is data of intra-coded I frame.

Embodiments of the present disclosure provide a network device, including:

a transceiver module, configured to receive a buffer status report BSR sent from a terminal device, wherein the BSR indicates that data to be transmitted of the terminal device comprise target-type data;

a processing module, configured to configure a transmitting resource preferentially for the terminal device based on the BSR.

According to exemplary embodiments, the transceiver module is further configured to:

transmit indicating information to the terminal device, wherein the indicating information indicates that the terminal device uses a configured transmitting resource to preferentially transmit data in a logical channel which carries the target-type data.

According to exemplary embodiments, the BSR comprises related information of target-type data, wherein the related information of target-type data comprises at least one of the following information: first information indicating a logical channel or a logical channel group which carries the target-type data, second information indicating a volume of target data which relates to the target-type data, and third information indicating a location of the target-type data in a logical channel.

According to exemplary embodiments, the volume of target data is a data volume of a data packet which comprises the target-type data; or, the volume of target data is a sum of a data volume of the target-type data and data volumes of data before the target-type data in a logical channel which carries the target-type data.

According to exemplary embodiments, the transceiver module is configured to:

receive, by the network device, a medium access control protocol data unit MAC PDU transmitted by the terminal device, wherein the MAC PDU comprises the BSR.

According to exemplary embodiments, a MAC service data unit SDU in the MAC PDU comprises the related information of the target-type data.

According to exemplary embodiments, the target-type data is data of intra-coded I frame.

According to exemplary embodiments, the computer readable medium is configured to store a computer program, wherein the computer program comprises the method in any one of claims 1 to 7.

Embodiments of the present disclosure provide a computer readable medium, wherein the computer readable medium is configured to store a computer program, wherein the computer program comprises the methods as described above.

FIG. 1 shows a method for resource scheduling according to an embodiment of the present disclosure. As shown in FIG. 1, the method 100 comprises:

At S110, a terminal device determines a buffer status report BSR, wherein the BSR indicates that data to be transmitted of the terminal device comprises target-type data;

At S120, the terminal device transmits the BSR to a network device, wherein the network device configures a transmitting resource preferentially for the terminal device based on the BSR. For example, the network device may allocate a transmitting resource preferentially for the terminal device based on the BSR.

According to the method for resource scheduling of the present disclosure, the terminal device transmits to a network device a BSR which indicates that data to be transmitted of the terminal device comprises the target-type data, so that the network device configures a transmitting resource preferentially for the terminal device when receiving the BSR, which reduces the possibility that a terminal device cannot transmit in time due to the fact that no transmitting resource has been allocated in time and improve the user experience.

It should be noted that which kind of data the target-type data are may be agreed between the network device and the terminal device in advance, or the network device may inform the terminal device that what kind of data the target-type data is through indicating information. The present disclosure does not limit what kind of data the target-type data is.

In the embodiments of the present disclosure, the network device and the terminal device may perform the following convention in advance: when data to be transmitted in a logical channel of the terminal device comprises the target-type data, the terminal device transmits the BSR in the embodiments of the present disclosure to the network device. When the network device receives the BSR in the embodiments of the present disclosure, it will configure a transmitting resource preferentially for the terminal device which has transmitted the BSR. The BSR in the embodiments of the present disclosure may be called as a "Critical BSR", which is different from the BSR in the related art.

It can be understood that if the terminal device does not need to transmit the target-type data, the terminal device may transmit the BSR in the related art to the network device, and the network device allocates a resource to the terminal device according to the method in the related art.

For example, in the embodiments of the present disclosure, if a Critical BSR does not carry a data volume of data to be transmitted in a logical channel of the terminal device, the network device may determine on its own to allocate a transmitting resource to the terminal device based on the state of current links.

Moreover, unlike the related that the terminal device uses a configured resource based on the priority of a logical channel, the network device and the terminal device may perform a convention in advance that if data to be transmitted of the terminal device comprise target-type data, the terminal device uses a configured transmitting resource to preferentially transmit data in a logical channel which carries the target-type data. Alternatively, the network device may transmit indicating information to the terminal device, which indicates that the terminal device uses a configured transmitting resource to preferentially transmit data in a logical channel which carries the target-type data.

As an example, the Critical BSR in the present disclosure may be a BSR for a logical channel, and an indicating bit is included in the Critical BSR to indicate that a BSR is a Critical BSR. And in this case, the network device may configure a dedicated resource for a logical channel corresponding to the Critical BSR. For example, the network device carries an identifier of the logical channel in information for configuring a transmitting resource, and after the terminal device determines a configured transmitting resource, only the configured transmitting resource is used to transmit data in the logical channel.

Further, in the case that the Critical BSR is only for one logical channel, the Critical BSR may also carry a data volume of data to be transmitted in the logical channel, or the Critical BSR may also carry a size of a data packet comprising target-type data, and/or, the Critical BSR also carries a location of target-type data in the logical channel. This is for the network device to configure a transmitting resource of appropriate size for the terminal device.

As an example, the Critical BSR in the present disclosure may be for a logical channel group. The network device carries a Critical BSR in a Media Access Control Protocol Data Unit (MAC PDU) which is transmitted to the terminal device. In this case, a reserved bit in the Logical Channel Identification (LCID) domain in the MAC Sub-head may be selected to indicate whether a BSR is a Critical BSR. Table 1 shows the correspondence between the LCID Values in existing protocols and the specific meanings of its representation. In the embodiments of the present disclosure, any value between 01011-11000 may be used to indicate that a BSR is Critical.

TABLE 1

| Index | LCID Values |
| --- | --- |
| 00000 | CCCH |
| 00001-01010 | Identify of the logical channel |
| 01011-11000 | Reserved |
| 11001 | Extended Power Headroom Report |
| 11011 | C-RNTI |
| 11100 | Truncated BSR |
| 11101 | Short BSR |
| 11110 | Long BSR |
| 11111 | Padding |

Further, in the case that the Critical BSR of the present disclosure is for one logical channel group, wherein the Critical BSR comprises related information of the target-type data, wherein the related information of the target-type data comprises at least one of the following information: first information indicating a logical channel or a logical channel group which carries the target-type data, second information indicating a volume of target data which relates to the target-type data, and third information indicating a location of the target-type data in a logical channel. The location of the target-type data in a logical channel here may be understood as the order in which the target-type data is scheduled in this logical channel.

According to exemplary embodiments, if the related information of the target-type data comprises the first information, the network device may configure a transmitting resource preferentially for a logical channel which carries the target-type data. For example, an identifier of the logical channel which carries the target-type data may be carried in information of the configured transmitting resource, and after the terminal device determines the configured transmitting resource, only the configured transmitting resource is used to transmit data in the logical channel. If the related information of the target-type data comprises the first information and the third information, the network device may configure a transmitting resource preferentially for a logical channel which carries the target-type data, and the network device may also configure a transmitting resource of appropriate size for the terminal device based on the location of the target-type data in the logical channel, thereby ensuring that the target-type data can be transmitted in time.

In the embodiments of the present disclosure, the volume of target data described above may be a data volume of a data packet comprising the target-type data, or a sum of data volumes of data before the target-type data in the logical channel which carries the target data. The data in the logical channel here before the target-type data may be understood as data in the logical channel whose scheduling order is before the target-type data.

Figure 2:
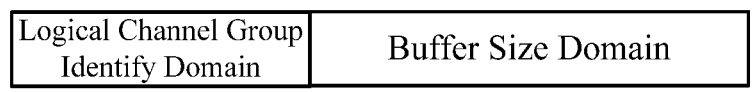
FIG. 2 is a schematic diagram of a buffer status report according to an embodiment of the present disclosure.

According to exemplary embodiments, if the network device carries a Critical BSR in a Medium Access Control Protocol Data Unit MAC PDU transmitted to the terminal device, the MAC Service Data Unit (SDU) in the MAC PDU carries related information of target-type data. FIG. 2 is a schematic diagram of a BSR according to the embodiments of the present disclosure. As shown in FIG. 2, the BSR of the embodiments of the present disclosure comprises a Logical Channel Group (LCG) Identify (ID) domain and a Buffer Size domain, wherein the LCG ID domain indicates a LCG corresponding to a BSR, wherein the Buffer Size domain comprises related information of target-type data.

As an example, the Critical BSR in the present disclosure may be for a plurality of logical channel groups. If there are target-type data that need to be transmitted in a plurality of logical channel groups of the terminal device, the terminal device transmits a Critical BSR for the plurality of logical channel groups.

Further, in the case that the Critical BSR of the present disclosure is for a plurality of logical channel groups, wherein the Critical BSR comprises related information of target-type data, wherein the related information of the target-type data comprises at least one of the following information: first information indicating a logical channel or a logical channel group which carries the target-type data, second information indicating a volume of target data which relates to the target-type data, and third information indicating a location of the target-type data in a logical channel.

According to exemplary embodiments, if the related information of the target-type data comprises the first information, wherein the first information indicates a logical channel group which carries the target data, the network device may configure a transmitting resource preferentially for a logical channel group which carries the target-type data. For example, an identifier of the logical channel group which carries the target-type data may be carried in information of the configured transmitting resource, and after the terminal device determines the configured transmitting resource, only the configured transmitting resource is used to transmit data in the logical channel group. When the terminal device uses the configured transmitting resource, the transmitting resource may be used based on the priorities of logical channels in the logical channel group. The transmitting resource may also be first used to transmit data in the logical channel which carries the target-type data, if there is any remained transmitting resource, then use the remained transmitting resource based on the priorities of other logical channels.

Alternatively, in some other embodiments, if the related information of the target-type data comprises the first information, wherein the first information indicates a logical channel which carries the target data, the network device may configure a transmitting resource preferentially for a logical channel which carries the target-type data. For example, an identifier of the logical channel which carries the target-type data may be carried in information of the configured transmitting resource by the network device, and after the terminal device determines the configured transmitting resource, only the configured transmitting resource is used to transmit data in the logical channel.

In all of the above embodiments, the network device and the terminal device may perform a convention in advance that which kind data of the target-type data are. For example, three kinds of coding frames are mainly defined in the coding standard (H264) of the media service. The frame that is completely encoded or the frame that is encoded as an independent static image is called as an I frame. The frame that is encoded with reference to the previous I frame and that only contains the encoded differential part is called as a P frame. The frame that is with reference to the frames before and after is called as a B frame. The importance of I frame is higher than the importance of P frame and B frame. Therefore, the network device and the terminal device may perform a convention that the target-type data are the I frame data. When the terminal device has data of I frame to be transmitted, the terminal device transmits the BSR of the embodiments of the present disclosure to the network device, so that the network device can configure a transmitting resource preferentially for the terminal device.

The method for resource scheduling according to the embodiments of the present disclosure is described above in detail from the terminal device side with reference to FIG. 1 and FIG. 2. The method for resource scheduling according to the embodiments of the present disclosure will be described in detail below from the network device side with reference to FIG. 3. It should be understood that the interaction between the network device and the terminal device described on the network device side is the same as that described on the terminal device side. To avoid repetition, relevant description is omitted as appropriate.

Figure 3:
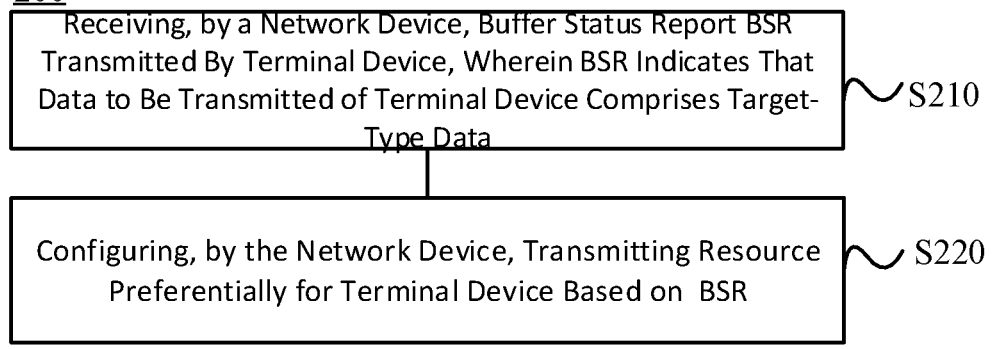
FIG. 3 is a schematic flow chart of a method for resource scheduling according to another embodiment of the present disclosure.

FIG. 3 is a method for resource scheduling according to another embodiment of the present disclosure. As shown in FIG. 3, the method 200 comprises:

At S210, a network device receives a buffer status report BSR transmitted by a terminal device, wherein the BSR indicates that data to be transmitted of the terminal device comprises target-type data;

At S220, the network device configures a transmitting resource preferentially for the terminal device based on the BSR.

Therefore, in the method for resource scheduling according to the embodiments of the present disclosure, the network device configures a transmitting resource preferentially for the terminal device after receiving the BSR which indicates that data to be transmitted of the terminal device comprise the target-type data. Therefore, the method for resource scheduling of the present disclosure can reduce the possibility that the terminal device cannot transmit in time due to the fact that no transmitting resource has been allocated in time and improve the user experience.

In the embodiments of the present disclosure, the method further comprises: the network device transmits indicating information to the terminal device, wherein the indicating information indicates that the terminal device uses a configured transmitting resource to preferentially transmit data in a logical channel which carries the target-type data.

After the network device configures a transmitting resource for the terminal device, the terminal device uses the configured transmitting resource based on the priority of a logical channel, so that if the priority of a logical channel where the target-type data is located is relatively low, the configured transmitting resource may not be used to transmit the target-type data. In the method of the present disclosure, the network device transmits the indicating information to the terminal device, which indicates that the terminal device uses the configured transmitting resource to preferentially transmit data in the logical channel where the target-type data is located, thereby further reducing the possibility that the target-type data cannot be transmitted in time and improving the user experience.

In the embodiments of the present disclosure, the BSR comprises related information of target-type data, wherein the related information of target-type data comprises at least one of the following information: first information indicating a logical channel or a logical channel group which carries the target-type data, second information indicating a volume of target data which relates to the target-type data, and third information indicating a location of the target-type data in a logical channel.

In the embodiments of the present disclosure, the volume of target data is a data volume of a data packet comprising the target-type data; or, the volume of target data is a sum of the data volume of the target-type data and data volumes of data before the target-type data in a logical channel which carries the target-type data.

In the embodiments of the present disclosure, the S210 is: receiving, by the network device, a medium access control protocol data unit MAC PDU transmitted by the terminal device, wherein the MAC PDU comprises the BSR.

In the embodiments of the present disclosure, a MAC service data unit SDU in the MAC PDU comprises related information of the target-type data.

In the embodiments of the present disclosure, the target-type data is data of intra-coded I frame.

Figure 4:
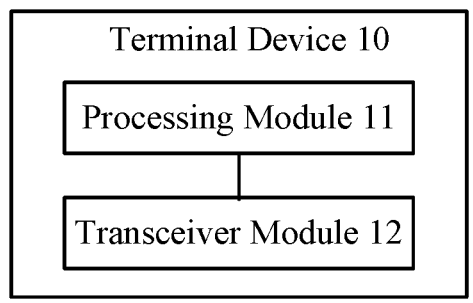
FIG. 4 is a schematic block diagram of a terminal device according to an embodiment of the present disclosure.

The method for resource scheduling according to embodiments of the present disclosure is described in detail with reference to FIG. 1 to FIG. 3. The terminal device according to the embodiments of the present disclosure will be described in detail below with reference to FIG. 4. As shown in FIG. 4, the terminal device 10 comprises:

a processing module 11, configured to determine a buffer status report BSR, wherein the BSR indicates that data to be transmitted of the terminal device comprises target-type data, wherein the target-type data are data need to be transmitted preferentially;

a transceiver module 12, configured to transmit the BSR to a network device, wherein the network device configures a transmitting resource preferentially for the terminal device based on the BSR.

Therefore, the terminal device according to the embodiments of the present disclosure transmits a buffer status report, which indicates that data to be transmitted of the terminal device comprise the target-type data, to the network device, so that the network device allocates a transmitting resource preferentially to the terminal device when receiving the buffer status report. Therefore, it can reduce the possibility that the terminal device cannot transmit in time due to the fact that no transmitting resource has been allocated in time and improve the user experience.

In the embodiments of the present disclosure, the transceiver module 12 is further configured to: receive indicating information transmitted by the network device, wherein the indicating information indicates that the terminal device uses a configured transmitting resource to preferentially transmit data in a logical channel which carries the target-type data.

In the embodiments of the present disclosure, the BSR comprises related information of target-type data, wherein the related information of target-type data comprises at least one of the following information: first information indicating a logical channel or a logical channel group which carries the target-type data, second information indicating a volume of target data which relates to the target-type data, and third information indicating a location of the target-type data in a logical channel.

In the embodiments of the present disclosure, the volume of target data is a data volume of a data packet which comprises the target-type data; or, the volume of target data is a sum of a data volume of the target-type data and data volumes of data before the target-type data in a logical channel which carries the target-type data.

In the embodiments of the present disclosure, the transceiver module 12 is further configured to: receive, by the network device, a medium access control protocol data unit MAC PDU, wherein the MAC PDU comprises the BSR.

In the embodiments of the present disclosure, a MAC service data unit SDU in the MAC PDU comprises related information of the target-type data.

In the embodiments of the present disclosure, the target-type data is data of intra-coded I frame.

The terminal device according to the embodiments of the present disclosure may refer to the processes of the method 100 corresponding to the embodiments of the present disclosure, and the respective units/modules in the terminal device and the other operations and/or functions described above are respectively implemented to implement the corresponding processes in the method 100. For brevity, it will not be covered again herein.

Figure 5:
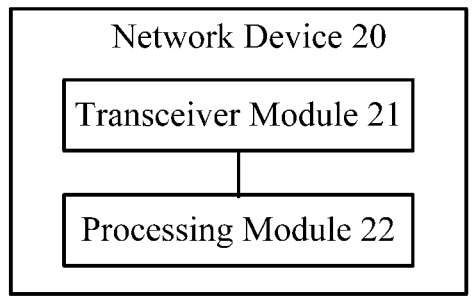
FIG. 5 is a schematic block diagram of a network device according to an embodiment of the present disclosure.

FIG. 5 is a schematic block diagram of a network device according to an embodiment of the present disclosure, as shown in FIG. 5, the network device 20 comprises:

a transceiver module 21, configured to receive a buffer status report BSR, wherein the BSR indicates that data to be transmitted of the terminal device comprise target-type data;

a processing module 22, configured to configure a transmitting resource preferentially for the terminal device based on the BSR.

Therefore, the network device according to the embodiments of the present disclosure configures a transmitting resource preferentially for the terminal device after receiving the BSR which indicates that data to be transmitted of the terminal device comprise the target-type data. Therefore, the method for resource scheduling of the present disclosure can reduce the possibility that the terminal device cannot transmit in time due to the fact that no transmitting resource has been allocated in time and improve the user experience.

In the embodiments of the present disclosure, the transceiver module 21 is further configured to: transmit indicating information to the terminal device, wherein the indicating information indicates that the terminal device uses a configured transmitting resource to preferentially transmit data in a logical channel which carries the target-type data.

In the embodiments of the present disclosure, the BSR comprises related information of target-type data, wherein the related information of target-type data comprises at least one of the following information: first information indicating a logical channel or a logical channel group which carries the target-type data, second information indicating a volume of target data which relates to the target-type data, and third information indicating a location of the target-type data in a logical channel.

In the embodiments of the present disclosure, the volume of target data is a data volume of a data packet which comprises the target-type data; or, the volume of target data is a sum of a data volume of the target-type data and data volumes of data before the target-type data in a logical channel which carries the target-type data.

In the embodiments of the present disclosure, the transceiver module 21 is configured to: receive, by the network device, a medium access control protocol data unit MAC PDU transmitted by the terminal device, wherein the MAC PDU comprises the BSR.

In the embodiments of the present disclosure, a MAC service data unit SDU in the MAC PDU comprises related information of the target-type data.

In the embodiments of the present disclosure, the target-type data is data of intra-coded I frame.

The network device according to the embodiments of the present disclosure may refer to the processes of the method 200 corresponding to the embodiments of the present disclosure, and the respective units/modules in the network device and the other operations and/or functions described above are respectively implemented to implement the corresponding processes in the method 200. For brevity, it will not be covered again herein.

Figure 6:
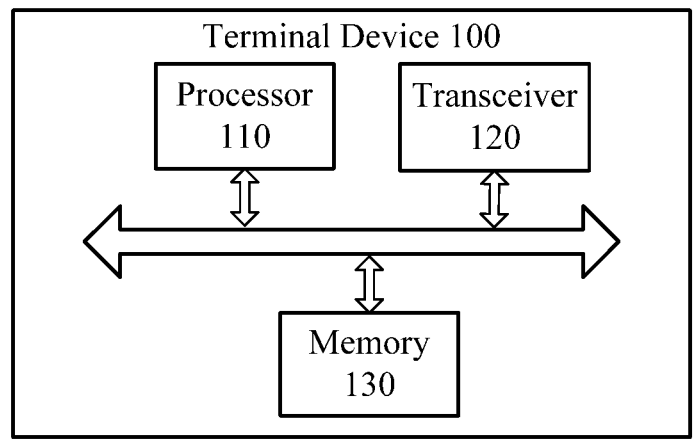
FIG. 6 is a schematic block diagram of a terminal device according to another embodiment of the present disclosure.

FIG. 6 shows a terminal device according to another embodiment of the present disclosure. As shown in FIG. 6, the terminal device 100 comprises a processor 110 and a transceiver 120, wherein the processor 110 is connected to the transceiver 120. According to exemplary embodiments, the network device 100 further comprises a memory 130, wherein the memory 130 is connected to the processor 110. The processor 110, the memory 130, and the transceiver 120 can communicate with each other through an internal connection path. The processor 110 is configured to determine a Buffer Status Report BSR, wherein the BSR indicates that data to be transmitted of the terminal device comprise target-type data, wherein the target-type data are data need to be transmitted preferentially; the transceiver 120 is configured to transmit the BSR to a network device, wherein the network device configures a transmitting resource preferentially for the terminal device based on the BSR.

Therefore, the terminal device according to the embodiments of the present disclosure transmits a buffer status report, which indicates that data to be transmitted of the terminal device comprise the target-type data, to the network device, so that the network device allocates a transmitting resource preferentially to the terminal device when receiving the buffer status report. Therefore, it can reduce the possibility that the terminal device cannot transmit in time due to the fact that no transmitting resource has been allocated in time and improve the user experience.

The terminal device 100 according to the embodiments of the present disclosure may refer to the processes of the terminal device 10 corresponding to the embodiments of the present disclosure, and the respective units/modules in the terminal device and the other operations and/or functions described above are respectively implemented to implement the corresponding processes in the method 100. For brevity, it will not be covered again herein.

Figure 7:
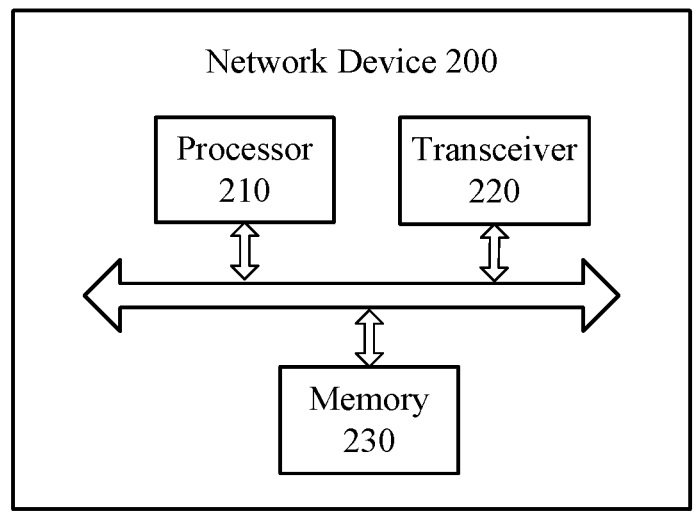
FIG. 7 is a schematic block diagram of a network device according to another embodiment of the present disclosure.

FIG. 7 shows a schematic block diagram of a network device according to another embodiment of the present disclosure. As shown in FIG. 7, the network device 200 comprises a processor 210 and a transceiver 220, wherein the processor 210 is connected to the transceiver 220. According to exemplary embodiments, the terminal device 200 further comprises a memory 230, wherein the memory 230 is connected to the processor 210. The processor 210, the memory 230, and the transceiver 220 can communicate with each other through an internal connection path. The transceiver 220 is configured to receive a buffer status report BSR sent by a terminal device, wherein the BSR indicates that data to be transmitted of the terminal device comprise target-type data; the processor 210 is configured to configure a transmitting resource preferentially for the terminal device based on the BSR.

Therefore, the network device according to the embodiments of the present disclosure configures a transmitting resource preferentially for the terminal device after receiving the BSR which indicates that data to be transmitted of the terminal device comprise the target-type data. Therefore, the method for resource scheduling of the present disclosure can reduce the possibility that the terminal device cannot transmit in time due to the fact that no transmitting resource has been allocated in time and improve the user experience.

The network device 200 according to the embodiments of the present disclosure may correspond to the network device 20 in the embodiments of the present disclosure, and the foregoing and other operations and/or functions of each unit/module in the network device are to respectively implement corresponding processes of the method 200. For brevity, it will not be covered again herein.

It should be understood that the processor of the embodiments of the present disclosure may be an integrated circuit chip with signal processing capability. In the process of implementation, the steps of the above embodiments of the method can be implemented by integrated logic circuit of hardware in the processor or instructions in the form of software. The above processor may be a general-purpose processor, a Digital Signal Processor (DSP), an Application Specific Integrated Circuit (ASIC), a Field Programmable Gate Array (FPGA), or other programmable logic devices, discrete gates, or transistor logic devices, discrete hardware components. It can implement or perform the various methods, steps, and logic blocks disclosed in the embodiments of the present disclosure. A general-purpose processor can be a microprocessor or the processor can be any conventional processor. The steps with reference to the method disclosed in the embodiments of the present disclosure may be directly implemented to be performed by a decoding processor, or may be performed by a combination of hardware and software modules in the decoding processor. Software modules can be located in a developed storage medium in this field, such as a random access memory, a flash memory, a read-only memory, a programmable read-only memory or an electrical erasable programmable memory, a register. The storage medium is located in the memory, and the processor reads the information in the memory and completes the steps of the above method with its hardware.

It can be understood that the memory in the embodiments of the present disclosure may be a volatile memory or a non-volatile memory, or may include both volatile and non-volatile memory. The non-volatile memory may be a Read-Only Memory (ROM), a Programmable Read-Only Memory (PROM), an Erasable PROM (EPROM), or an Electrically EPROM (EEPROM) or a flash memory. The volatile memory may be a Random Access Memory (RAM), which is used as an external cache. By exemplary but not restricted illustration, many forms of RAM are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM)) and a Direct Rambus RAM (DR RAM). It should be noted that the memories of the systems and methods described herein are intended to comprise, without being limited to, these and any other suitable types of memory.

It may be realized by an ordinary person skilled in the art that various units and algorithm steps of various embodiments described in conjunction with the embodiments disclosed herein may be implemented in electronic hardware, or a combination of electronic hardware and computer software. Whether these functions are implemented in hardware or software depends on specific applications and design constraints of technical solutions. A person skilled in the art may implement the described functions with different methods for each of specific applications, but such implementations shall not be regarded as going beyond the scope of the present disclosure.

A person skilled in the art may clearly understand that for the sake of convenience and conciseness in description, corresponding processes in the forgoing method embodiments can be referenced for the specific work processes of the systems, devices and units described in the above, which are not further described herein.

In several embodiments provided by the present disclosure, it should be understood that the disclosed systems, devices and methods may be implemented by other means. For example, the device embodiments described above are merely schematic. For example, the partitioning of the units may be a partitioning in logical functions. There may be other manners for partitioning in actual implementation. For example, multiple units or components may be combined together or integrated into another system, or some features can be omitted or not executed. In addition, mutual couplings or direct couplings or communication connections that are shown or discussed may be indirect couplings or communication connections through some interfaces, devices or units, and may be in electrical, mechanical or other forms.

The units described as separated components may be or may not be physically separated. The components shown as units may be or may not be physical units, that is, they may be located in one place or may be distributed on a plurality of network units. Part or all of the units may be selected according to actual needs to achieve the purposes of the solutions of the embodiments of the present disclosure.

In addition, all functional units in the embodiments of the present disclosure may be integrated into one processing unit. Or, each unit exists independently in physics. Or, two or more units may be integrated into one unit.

The functional units, if implemented in the form of the software functional unit and sold or used as a standalone product, may be stored in a computer-readable storage medium. Based on such an understanding, the technical solution of the present disclosure in essence, or the part that contributes to the related art, or all or part of the technical solution, may be embodied in the form of a software product. The computer software product is stored in a storage medium and includes a plurality of instructions for a computer device (which may be a personal computer, a server, a network device or the like) to execute all or part of the steps of the method described in the embodiments of the present disclosure. The foregoing storage medium includes various media that may store program code, such as a USB flash disk, a mobile hard disk, a Read-Only Memory (ROM), a Random Access Memory (RAM), a magnetic disk, an optical disk.

The above description is merely exemplary implementations of the present disclosure, but the scope of protection of the present disclosure is not limited to this. Any modification or replacement that would be readily conceived by any person skilled in the art within the scope of the technology disclosed in the present disclosure should be within the scope of protection of the present disclosure. Therefore, the scope of protection of the present disclosure shall be defined by the claims.

What is claimed is:

1. A method for resource scheduling, comprising:
determining, by a terminal device, a buffer status report BSR, wherein the BSR indicates that data to be transmitted of the terminal device comprises I frame data as defined in a coding standard H264 of a media service;
transmitting, by the terminal device, the BSR to a network device, wherein the network device configures a transmitting resource for the terminal device based on the BSR;
wherein the BSR comprises related information of the I frame data, wherein the related information of the I frame data comprises: first information indicating a logical channel or a logical channel group which carries the I frame data, second information indicating a volume of target data which relates to the I frame data, and third information indicating a location of the I frame data in the logical channel;
wherein the volume of target data is a sum of a data volume of the I frame data and data volumes of data before the I frame data in a logical channel which carries the I frame data.

2. The method according to claim 1, further comprising:
receiving, by the terminal device, indicating information transmitted by the network device, wherein the indicating information indicates that the terminal device uses a configured transmitting resource to transmit data in a logical channel which carries the I frame data.

3. The method according to claim 1, wherein the transmitting, by the terminal device, the BSR to the network device comprises:
transmitting, by the terminal device, a medium access control protocol data unit MAC PDU to the network device, wherein the MAC PDU comprises the BSR.

4. The method according to claim 3, wherein a MAC service data unit SDU in the MAC PDU comprises the related information of the I frame data.

5. The method according to claim 1, wherein the I frame data is data of intra-coded I frame.

6. A method for resource scheduling, comprising:
receiving, by a network device, a buffer status report BSR transmitted by a terminal device, wherein the BSR indicates that data to be transmitted of the terminal device comprises I frame data as defined in a coding standard H264 of a media service;
configuring, by the network device, a transmitting resource preferentially for the terminal device based on the BSR;
wherein the BSR comprises related information of the I frame data, wherein the related information of the I frame data comprises: first information indicating a logical channel or a logical channel group which carries the I frame data, second information indicating a volume of target data which relates to the I frame data, and third information indicating a location of the I frame data in the logical channel;
wherein the volume of target data is a sum of a data volume of the I frame data and data volumes of data before the I frame data in a logical channel which carries the I frame data.

7. The method according to claim 6, further comprising:
transmitting, by the network device, indicating information to the terminal device, wherein the indicating information indicates that the terminal device uses a configured transmitting resource to transmit data in a logical channel which carries the I frame data.

8. The method according to claim 6, wherein the receiving, by the network device, a buffer status report BSR transmitted by a terminal device comprises:
receiving, by the network device, a medium access control protocol data unit MAC PDU transmitted by the terminal device, wherein the MAC PDU comprises the BSR.

9. The method according to claim 8, wherein a MAC service data unit SDU in the MAC PDU comprises the related information of the I frame data.

10. A terminal device, comprising:
a processor; and
a transceiver;
wherein the processor is configured to determine a buffer status report BSR, wherein the BSR indicates that data to be transmitted of the terminal device comprises I frame data as defined in a coding standard H264 of a media service;
wherein the transceiver is configured to transmit the BSR to a network device, wherein the network device configures a transmitting resource for the terminal device based on the BSR;
wherein the BSR comprises related information of the I frame data, wherein the related information of the I frame data comprises: first information indicating a logical channel or a logical channel group which carries the I frame data, second information indicating a volume of target data which relates to the I frame data, and third information indicating a location of the I frame data in the logical channel;
wherein the volume of target data is a sum of a data volume of the I frame data and data volumes of data before the I frame data in a logical channel which carries the I frame data.

11. The terminal device according to claim 10, wherein the transceiver is further configured to:
receive indicating information transmitted by the network device, wherein the indicating information indicates that the terminal device uses a configured transmitting resource to transmit data in a logical channel which carries the I frame data.

12. The terminal device according to claim 10, wherein the transceiver is configured to:

transmit a medium access control protocol data unit MAC PDU to the network device, wherein the MAC PDU comprises the BSR.

13. The terminal device according to claim 12, wherein a MAC service data unit SDU in the MAC PDU comprises the related information of the I frame data.

14. The terminal device according to claim 10, wherein the I frame data is data of intra-coded I frame.

* * * * *